United States Patent
Watanabe

(10) Patent No.: US 7,024,526 B2
(45) Date of Patent: Apr. 4, 2006

(54) APPARATUS AND METHOD OF NULL DATA SKIP REMOTE COPY

(75) Inventor: Naoki Watanabe, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 324 days.

(21) Appl. No.: 10/286,513

(22) Filed: Oct. 31, 2002

(65) Prior Publication Data

US 2004/0088505 A1    May 6, 2004

(51) Int. Cl.
*G06F 12/00* (2006.01)
(52) U.S. Cl. .................. 711/161; 711/162; 707/204
(58) Field of Classification Search ............... 711/161, 711/162; 707/204
See application file for complete search history.

(56) References Cited

U.S. PATENT DOCUMENTS

| | | | |
|---|---|---|---|
| 4,803,651 A | | 2/1989 | Galkowski |
| 5,031,218 A | | 7/1991 | Faland et al. |
| 5,249,279 A | | 9/1993 | Schmenk et al. |
| 5,592,648 A | | 1/1997 | Schultz et al. |
| 5,634,124 A | | 5/1997 | Khoyi et al. |
| 5,758,062 A | | 5/1998 | McMahon et al. |
| 5,761,676 A | * | 6/1998 | Wood et al. ................. 707/202 |
| 5,796,735 A | | 8/1998 | Miller et al. |
| 6,073,221 A | * | 6/2000 | Beal et al. ................... 711/162 |
| 6,094,443 A | | 7/2000 | Dwork |
| 6,338,057 B1 | | 1/2002 | Weeks |
| 6,745,305 B1 | * | 6/2004 | McDowell ................... 711/162 |
| 2001/0055316 A1 | | 12/2001 | Lerman et al. |

OTHER PUBLICATIONS

"Method for Copying Differently Formatted Records With a Field Processor," IBM Technical Disclosure Bulletin, pp 48-50, May 1988.

* cited by examiner

*Primary Examiner*—B. James Peikari
*Assistant Examiner*—Woo H. Choi
(74) *Attorney, Agent, or Firm*—Townsend and Townsend and Crew LLP

(57) ABSTRACT

A method and apparatus are provided for enhancing the performance of storage systems is described. In the making of an initial copy to a secondary subsystem, or in the initial storage of data onto a primary storage subsystem, null data is skipped. The data may be skipped by sending the non-null data in sequence so missing addresses are identified as being null data, or a skip message may be used to designate regions where null data is to be present.

21 Claims, 10 Drawing Sheets

| Bit<br>Byte | 7 | 6 | 5 | 4 | 3 | 2 | 1 | 0 |
|---|---|---|---|---|---|---|---|---|
| 0 | OPERATION CODE (0xCA) ||||||||
| 1 | Reserved ||| DPO | FUA | Reserved || RELADR |
| 2 | (MSB) | LOGICAL BLOCK ADDRESS |||||||
| 3 | | | | | | | | |
| 4 | | | | | | | | |
| 5 | | | | | | | | (LSB) |
| 6 | Reserved ||||||||
| 7 | (MSB) | TRANSFER LENGTH |||||||
| 8 | | | | | | | | (LSB) |
| 9 | Control ||||||||

*FIG. 11*

| Bit<br>Byte | 7 | 6 | 5 | 4 | 3 | 2 | 1 | 0 |
|---|---|---|---|---|---|---|---|---|
| 0 | OPERATION CODE (0xCA) ||||||||
| 1 | Reserved ||| DPO | FUA | Reserved || RELADR |
| 2 | (MSB) | LOGICAL BLOCK ADDRESS |||||||
| 3 | | | | | | | | |
| 4 | | | | | | | | |
| 5 | | | | | | | | (LSB) |
| 6 | Pattern ||||||||
| 7 | (MSB) | TRANSFER LENGTH |||||||
| 8 | | | | | | | | (LSB) |
| 9 | Control ||||||||

*FIG. 12*

| # | Application | Detect null data at primary | null data information | Action at target subsystem |
|---|---|---|---|---|
| 1 | Initial copy | Disk controller | Skip message | Write null data |
| 2 | | | | Nothing (formatted) |
| 3 | | | Just skip | Write null data |
| 4 | | | | Nothing (formatted) |
| 5 | Host write | Channel controller | Skip message | Write null data at primary |

APPARATUS AND METHOD OF NULL DATA SKIP REMOTE COPY

BACKGROUND OF THE INVENTION

Modern storage systems provide users with the capability of storing and backing up enormous amounts of data quickly over networks among various local and remote locations. In such systems, an initial copy of disks at a primary storage site is made to disks at a secondary storage site. The storage system is typically configured to automatically copy the entire disk, and configure the disks at the primary and remote storage sites as remote copy pairs. In performing these operations, typically an initial copy of the disk at the primary site is made to a corresponding disk at the secondary site. As operations at the primary site change the data there, that changed data is "mirrored" at the secondary site by transmission from the primary site to the secondary site of the changed data.

It is well know, however, that most customers or users of data processing systems do not use the entire storage capability of the hard disk drives situated at their facility. Thus, each hard disk drive will include information which is desired to be backed up or transferred to the secondary or remote site, as well as large amounts of "null" data. This null data represents the contents of all of the portions of the hard disk which are not being used by the customer at that time. For example, the null data may consist of formatted, but unused portions of the disk.

With the sizes of hard disks continuously increasing, substantial time and network resources are being employed to transfer and store this null data at remote sites when the entire hard disk at a primary site is copied in a remote copy operation to a hard disk at the secondary site. This extensive copying of null data depletes system resources and network bandwidth, and is generally undesirable.

The effect has been alleviated to some extent by data compression techniques. Such data compression techniques can reduce network traffic by compressing the data to be transmitted over the network so that it consumes less bandwidth. Examples of such compression technology in storage systems include the UltraNet Edge Storage Router™ sold by CNT of Minneapolis, Minn., or the 9801SNS Storage Network System™ sold by Inrange Technologies Corp. of Lumberton, N.J. Although those products reduce the load on the network in the sense the fewer bits are transferred, they increase the load on the transmitting and receiving units which must compress and decompress the data, and the decompressed data still includes the null data which is written to the target storage subsystem.

What is needed is a method and apparatus which can avoid transmitting and copying null data, thereby reducing the load on the network, the transmitting system and the receiving system.

BRIEF SUMMARY OF THE INVENTION

This invention provides a method and apparatus which eliminates the need to copy null data across a storage network. The invention reduces the load on controllers for the remote copy operation, and reduces the load on the network by eliminating the need to transmit the null data. The invention has a variety of implementations. In one implementation, at the primary storage subsystem, the disk controller detects the null data as it moves data from a disk to a cache memory for transmission. It reports the null data to the channel controller so that the null data is not sent across the network. In another implementation, the disk controller detects the null data as it moves data from the host channel to the cache memory and reports the presence of the null data to the channel controller, thereby again precluding its being transmitted.

Once the null data is detected, there are a variety of approaches for handling the remote copy command. In one approach, satisfactory for the initial remote copy operation, the null data is simply not transmitted to the receiving storage system. In this implementation, before the remote copy operation is begun, the disks at the secondary storage subsystem which are to be configured as remote copy pairs, are formatted. Then, the "good" information is transmitted over the network to the mirroring disk in the secondary subsystem. Because the disks in the secondary system have been formatted, everywhere that the non-null information is stored will be useful, and all other portions of the disk will contain null data. The null data will be stored on the remote disk in whatever format that disk is formatted, e.g., all zeros, all ones, or some other desired pattern.

Another approach to handling the null data is that during the initial remote copy operation the addresses of the all the good data are maintained in order. As the good data is written to the secondary storage unit, the storage unit itself writes null data to any skipped areas between the good areas.

A third approach, useful for both the host write and the initial copy, has the detector of the null data generating a "skip message." Whenever the primary storage detects null data, it creates a skip message which includes the skipped address, the size and the pattern of the null data. When this is received by the targeted storage, writing of the data into the selected region is blocked, or the desired size and pattern are written. Typically the data will be blocked if the disk has already been formatted, or a desired null data pattern will be written wherever the skip message directs.

In a preferred embodiment, a method for copying information from a primary storage system to a secondary storage system, includes the steps of at the primary storage system, analyzing the information to be copied to determine if it constitutes data desired to be copied or null data which does not need to be copied; transmitting to the secondary storage system the data desired to be copied and not transmitting the null data; and at the secondary storage system, writing to a storage unit in the secondary storage system the information to be copied. In some embodiments the secondary storage unit is formatted before the data is copied to the before the step of copying is performed. In other embodiments when null data is detected at the primary storage unit, a skip message is sent to the secondary storage unit which indicates that a block of null data is present on the primary storage system and will not be transmitted to the secondary storage system. In other embodiments where the secondary storage system has not been formatted, only the information to be copied will be transmitted, but the storage controller at the secondary system will write null data in all other locations on the media.

BRIEF DESCRIPTION OF THE DRAWINGS

FIG. 11 shows an example of an "skip message" using a vendor-specific command;

FIG. 12 is another example of a skip message, but one which illustrates a data pattern;

DESCRIPTION OF THE PREFERRED EMBODIMENTS

Figure 1:
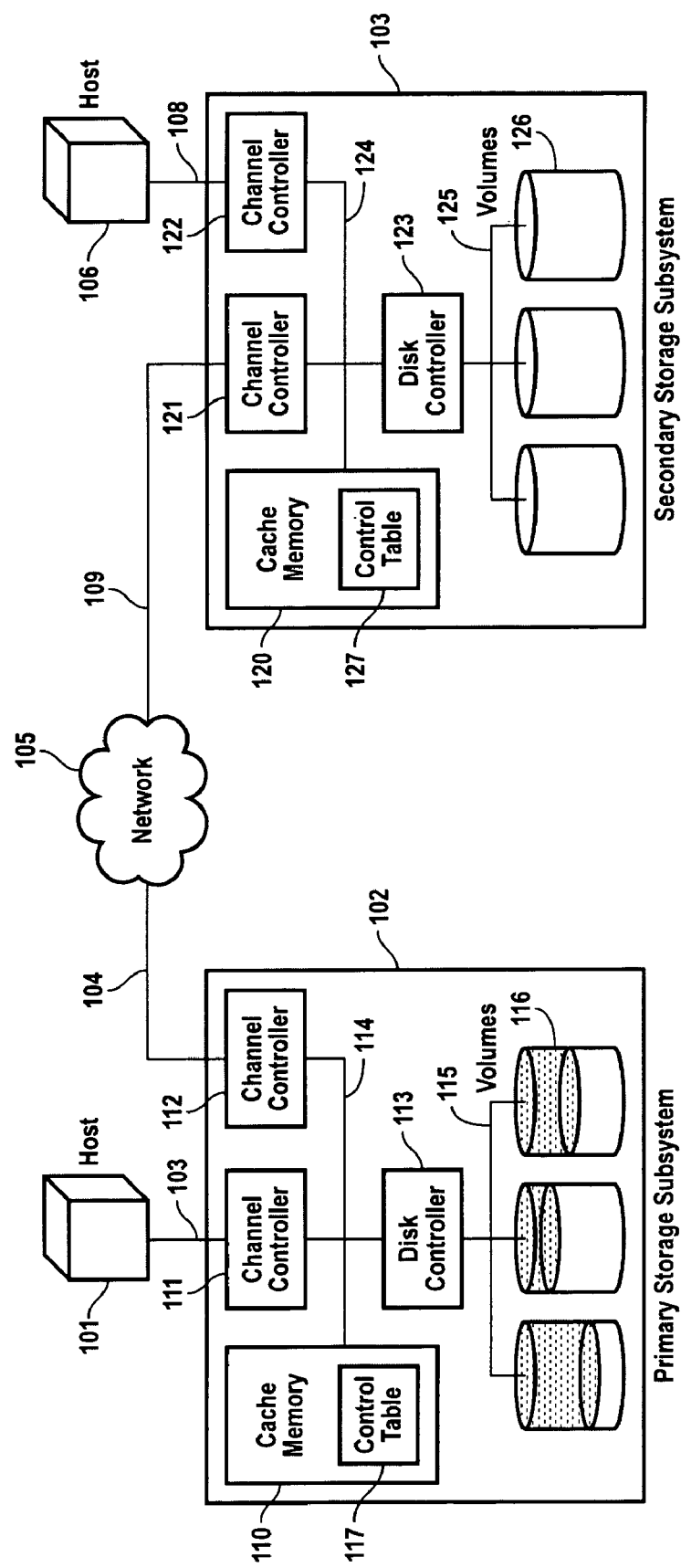
FIG. 1 is a diagram illustrating a storage system which includes a primary storage subsystem and a secondary storage subsystem which communicate with each other via a network.

FIG. 1 is a diagram illustrating a typical prior art storage system in which a primary storage subsystem 102 is coupled to a secondary storage subsystem 103 through a network 105. Typically, network 105 will be a conventional network, for example, a network using ATM, sonet, dark fibre, or internet protocol communications. Furthermore, while FIG. 1 depicts a single primary storage subsystem and a single secondary storage subsystem, as many or as few storage systems as desired may be employed, remotely situated from one another in desired locations. Conventional uses for such storage systems are to facilitate sharing of data in a large enterprise, to provide increased reliability by providing backup copies of data, or the like.

The primary storage system generally operates under control of a host 101 which is coupled to the storage subsystem 102 by a channel 103. Channel 103 interfaces to the storage subsystem 102 via a channel controller 111. Typically, another channel controller 112 is used to interface the storage subsystem 102 with a channel 104 to network 105.

The secondary storage system 103 is similarly configured with host 106 controlling the secondary system 103 via channel 108 and channel controller 122. Another channel controller 121 provides an interface between the secondary storage subsystem 103 and the channel 109 coupled to network 105. Typical implementations for channels 103, 104, 108, and 109 are fibre channel, ESCON, SCSI, or GE. Channels 104 and 109 couple to network 105, which itself can be public or private.

Storage system 102, in addition to the channel controllers already mentioned, includes a cache memory 110 operating under control of a control table 117. An internal bus 114 allows cache memory 110 to communicate with the channel controllers 111 and 112 and with a disk controller 113. Through another internal bus 115, for example a fibre channel, SCSI, or ATA bus, disk controller 113 communicates with storage volumes 116. The storage subsystems are generally configured similarly. Thus, in general, the structure of the primary storage subsystem 102 is matched by the structure of the secondary storage subsystem 103.

Generally, data is shifted in and out of the primary storage subsystem via the channel controllers and the cache memory. As data arrives to be written into the storage volumes, it is temporarily stored in the cache memory and then retrieved by the disk controller to be written into the volumes. Similarly, as data is retrieved from the volumes 116 to be transmitted out over the network, it will generally be stored in the cache memory before being supplied to the channel controller in larger blocks. The storage subsystem translates physical disk addresses to logical disk addresses which are viewed by the host.

As mentioned above, in a typical operation, it will be desired to "mirror" data from volumes 116 in the primary storage subsystem 102 onto volumes 126 in the secondary storage subsystem 103. As also mentioned above, because of the substantial storage capability typically provided in systems such as depicted in FIG. 1, there can be substantial amounts of "null" data present on volumes 116. This null data can take the form of large portions of formatted, but unwritten, regions on the hard disk drives, or of files or portions of files for which directory entries are no longer valid (indicating erasure, etc.). To improve the performance of the storage subsystems, reduce the load on the channel controllers and network, it is advantageous not to transmit this large quantity of null data through the primary storage subsystem, across channel 104, through network 105, and into channel 109 where it is rewritten onto disk volumes 126. Below we explain how this is achieved.

Figure 2:
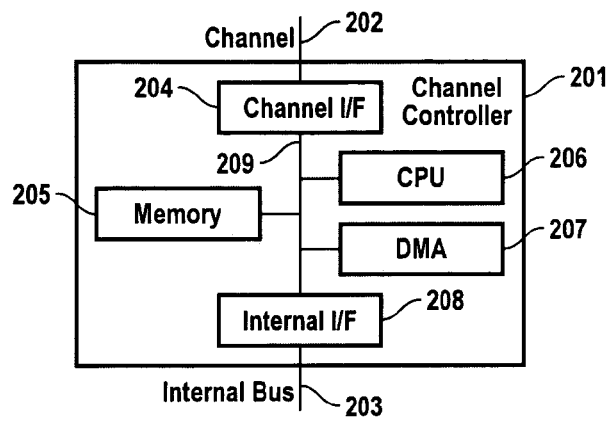
FIG. 2 is a diagram which illustrates the configuration of a channel controller as shown in block form in FIG. 1.

FIG. 2 is a block diagram of the channel controller, for example any of the channel controllers shown as blocks 111, 112, 121 or 122 in FIG. 1. The channel controller 201 of FIG. 2 includes within it a channel interface 204, a central processing unit 206, memory 205, a direct memory access circuit 207, and interface 208 to an internal bus 203. Interface 204 serves to interface the channel controller with higher level functionality, for example, a network or a host, while interface 208 provides an interface for channel controller 201 to internal functionality of the storage subsystem, such as a cache memory or disk controller. CPU 206 controls the components of the channel 201 by communications over bus 209. The channel interface 204 controls the channel protocol and controls the transfer of data to and from the channel, and with CPU 206 and DMA 207, the transfer of data between memory 205 and channel interface 204. The internal interface 208 controls the protocol of transmissions on internal bus 203, and the control of data over that line in response to activities of the DMA controller 207 and memory 205.

Figure 3:
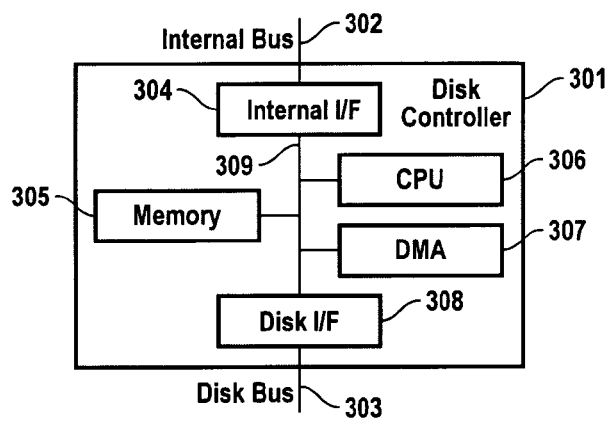
FIG. 3 is a diagram illustrating the configuration of a disk controller, also shown in block form in FIG. 1.

FIG. 3 is a schematic diagram illustrating the structure of the disk controller 301. Controller 301 can be used to implement disk controllers 113 or 123 in FIG. 1. The disk controller has two types of interfaces. One interface, the internal interface 304, is an interface for the internal bus 302 (or 203 in FIG. 2). The other interface 308 is an interface for disk bus 303 to enable communications to the storage volumes coupled to the disk bus 303. The internal interface 304 and the disk interface 308 are coupled via bus 309. The disk controller includes a CPU 306 and memory 305, as well as a DMA controller 307. These components regulate the flow of information between the internal bus 302 and the disk bus 303. The internal interface 304 controls the internal bus protocol and transfers data to and from the internal bus, and to and from memory 305, in conjunction with DMA controller 307. Similarly, the disk interface 308 controls the protocol on the disk bus 303 and transfers data under control of CPU 306, DMA controller 307 between the memory 305 and the disk bus 303. As mentioned above in some embodiments, disk controller 301 is capable of detecting null data in the storage volumes associated with the disk bus 303. DMA controller 307 employs known technology to "snoop" bus 309. When DMA controller 307 detects null data, it places appropriate signals on bus 309 to alert the other components coupled to the bus. This is discussed further below.

Figure 4:
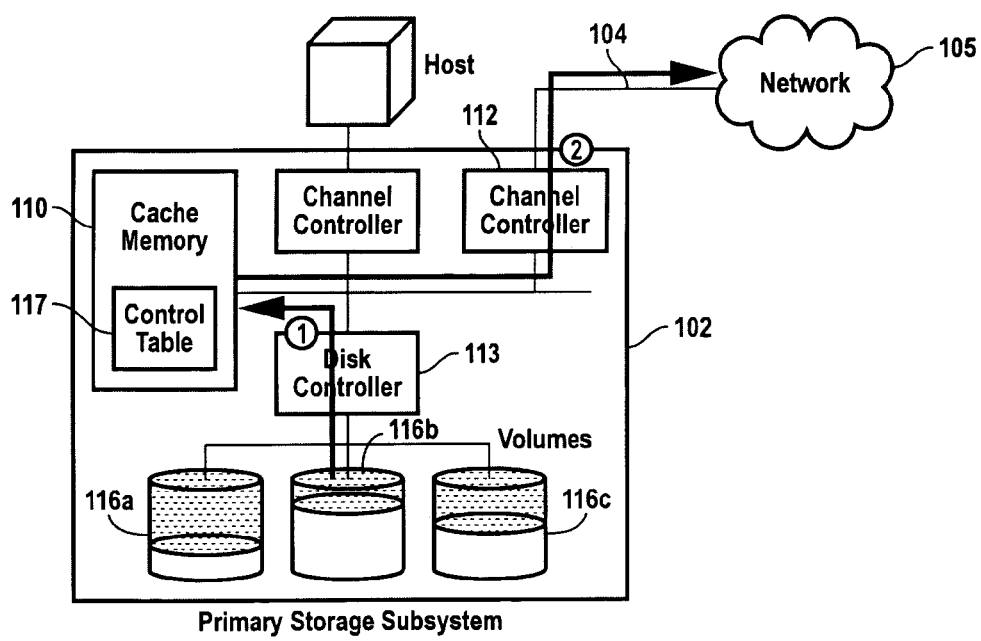
FIG. 4 is a diagram of the primary storage system illustrating its operations in an initial copy process.
Figure 5:
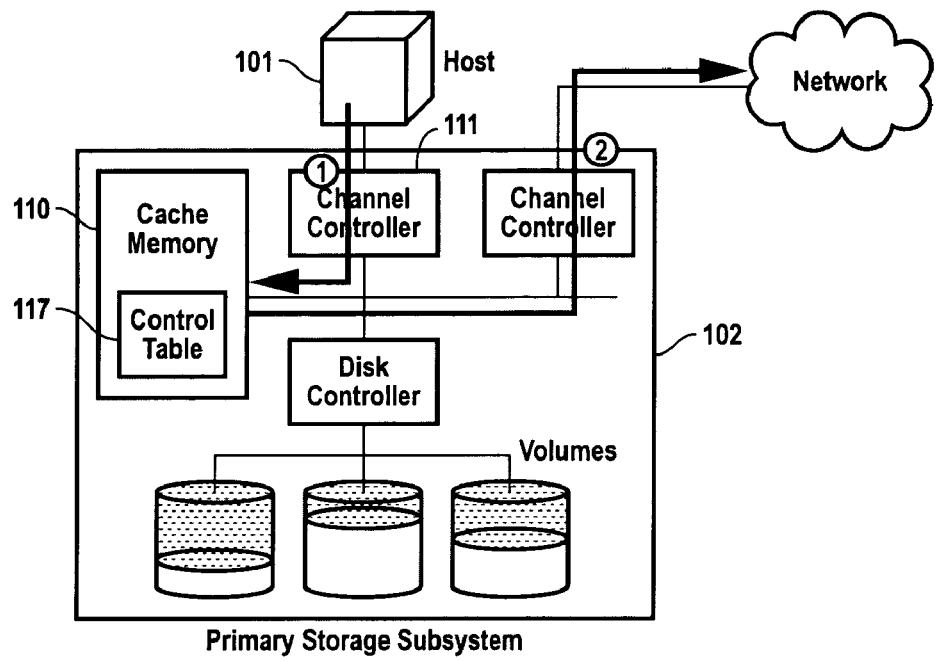
FIG. 5 is a diagram further illustrating this process.
Figure 6:
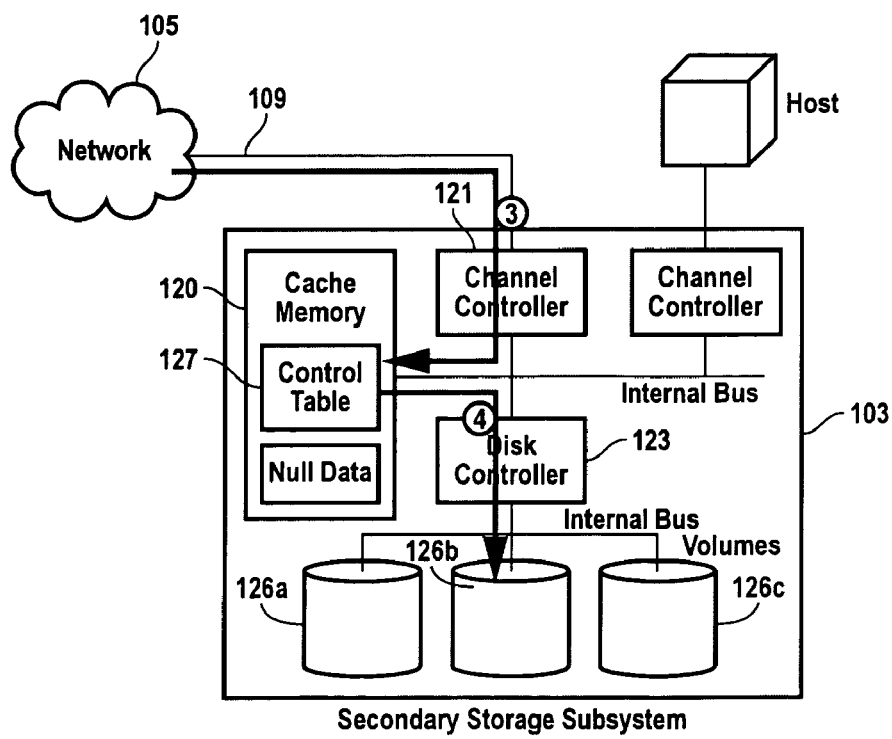
FIG. 6 is a diagram illustrating actions at the secondary storage subsystem in response to commands from the primary storage subsystem.

FIGS. 4–6 illustrate an overview of an initial copy process on each of the primary and secondary storage subsystems. FIG. 4 is a diagram which illustrates the primary storage subsystem 102 as it operates to make an initial copy. The first operation which occurs is that disk controller 113 reads disk data from a disk 116b and provides it to cache memory 110. The channel controller 112 operating under control of its internal CPU (not shown) monitors the transactions, and when an appropriate amount of data is stored into cache memory 110 along with associated entries of disk controller 113 into the control table 117, initiates a transfer. When this desired amount of data is stored into the cache memory 110, channel controller 112 issues a "write" command (or a vendor-specific command in the case of certain types of systems as discussed below) begins to process the initial copy. The channel controller 112 sends the initial copy data from cache memory 110 out over channel 104 to network 105. Once on network 105 the data is transmitted to the secondary storage system (not shown).

FIG. 5 illustrates the operations of the primary storage subsystem 102 during a remote copy process. The process is initiated by host 101 issuing a write command to the system 102. When this occurs, the channel controller 111 receives and analyzes the command. For this command, the channel controller 111 receives write data from host 101 which it then stores in cache memory 110. Controller 111 also stores information about this remote copy into control table 117. If the data from the cache memory 110 is ultimately stored on a disk as one of the pair of remote copy pairs, then channel controller 112 will issue a remote copy command to the secondary storage subsystem (not shown).

FIG. 6 is a diagram which illustrates the operation of the secondary storage subsystem 103 when an initial copy or remote copy data arrive over the network via channel 109. In this case the channel controller 121 analyzes the incoming command and stores the data into the cache memory 120 and makes an appropriate entry in the control table 127. The disk controller 123 periodically checks the control table 127. If the disk controller 123 finds procedures which are to be performed by the disk controller, then the disk controller reads data from cache memory 120 and writes it onto the target disk, in this case, disk 126b.

Note that in a preferred embodiment of this invention, any overhead associated with the step designated (2) in FIG. 4, (2) in FIG. 5, or (3) in FIG. 6 is reduced when null data is to be transferred. In other words, the operations discussed with respect to FIGS. 4–6 will be carried out just as described when ordinary (non-null) data is being processed. These procedures, however, will not be necessary when null data is being processed.

Figure 7:
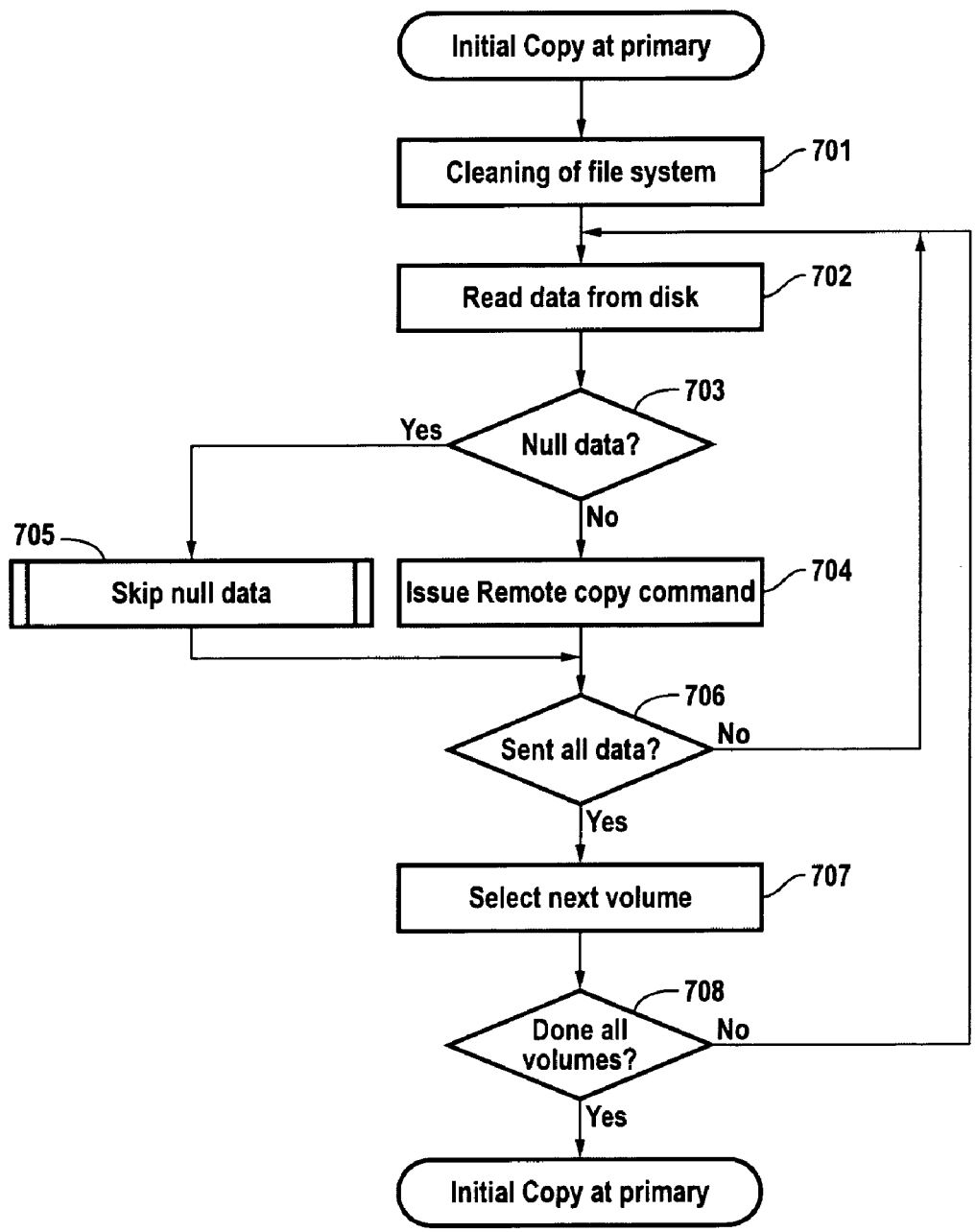
FIG. 7 is a flowchart illustrating steps in an initial copy operation at the primary storage system.

FIG. 7 is a flowchart illustrating a preferred embodiment of the method of this invention. The flowchart illustrates the initial copy procedure performed at the location of the primary storage subsystem 102 (see FIG. 1). Before the initial copy procedure begins, however, the primary and secondary systems are synchronized to establish the remote copy pair, i.e., the correspondence between the disks at the primary storage subsystem and those at the secondary storage subsystem location. This activity is performed by a system administrator. After completion of that well known procedure, the initial copy procedure of FIG. 7 is performed. The first step in carrying out this implementation of the initial copy procedure is cleaning of the file system 701. In this step, the unused portion of the primary disk, and all of the secondary disk, are filled with null data. This operation is performed using commercially available software, for example, BC Wipe™ available from Jetico of Tampere, Finland. The combination of using the cleanup software and skipping the copying of null data as described herein substantially reduces the overhead of the remote copy procedure. The cleanup procedure, however, is not mandatory, as will be evident from the following explanation.

Once the cleanup is completed, the making of the initial copy begins with step 702 in which data is read from the target disk. In this operation, the disk controller 113 reads data from the disk and provides it to the cache memory 110. The reading and writing to the cache is usually performed using large amounts of data for each transfer, for example, 1 megabyte. The transfer itself is carried out under control of DMA 308.

As shown by FIG. 7, as the data is read, it is checked to determine whether null data is present at step 703. This operation is performed by DMA 307 monitoring bus traffic to determine the data pattern. Such an operation is usually termed "snooping." When DMA 307 detects that the data pattern consists of null data, that information is provided to CPU 306. The determination of whether data is null data or not will be based upon the particular software used for the cleaning operation, or the particular software used to format the hard disk before the initial copy is performed. Typically, the null data will consist of either all zeros, all ones, or a repeating pattern of zeros and ones, for example, 010101. When this pattern occurs, the CPU 306 instructs the system to skip copying that null data by using control table 117. On the other hand, when the data consists of random patterns of ones and zeros, then the CPU 306 places an entry in the control table 117 enabling normal operation.

As the data is transferred, the channel controller 112 periodically checks the control table 117. When the channel controller, using table 117, determines that "normal" data is to be copied—the initial copy—then the channel controller 112 does a data transfer. During this transfer, data will ultimately be copied from the primary storage system 102 to the secondary storage system 103. The CPU 206 then sends commands to DMA 207 to transfer data from the cache memory 110 into the memory 205. After that, the CPU 206 sends a command to the channel interface unit 112 causing it to issue the initial copy (remote copy) command to the secondary storage system 103 over network 105. The issuance of the remote copy command is shown at step 704.

When the request is to skip copying null data, CPU 206 issues a skip message, and does not transfer data. The skip message itself indicates that one or more quantities of data (the 1 megabyte size referred to above) are not to be copied. The disk controller continues to repeat steps 702–705 shown in FIG. 7 until all of the data on the disk has been transmitted to the secondary subsystem or designated to be null data. This is shown by the test at step 706.

As shown by step 707, once all of the data on a disk has been transferred or determined to be null data, the disk controller then selects the next disk or volume and repeats the procedure. Eventually, as shown by step 708, all of the volumes of storage at the primary location will have been initially copied or remote copied to the secondary storage location. At this point, the initial copy process is completed at the primary storage location 102.

Figure 8:
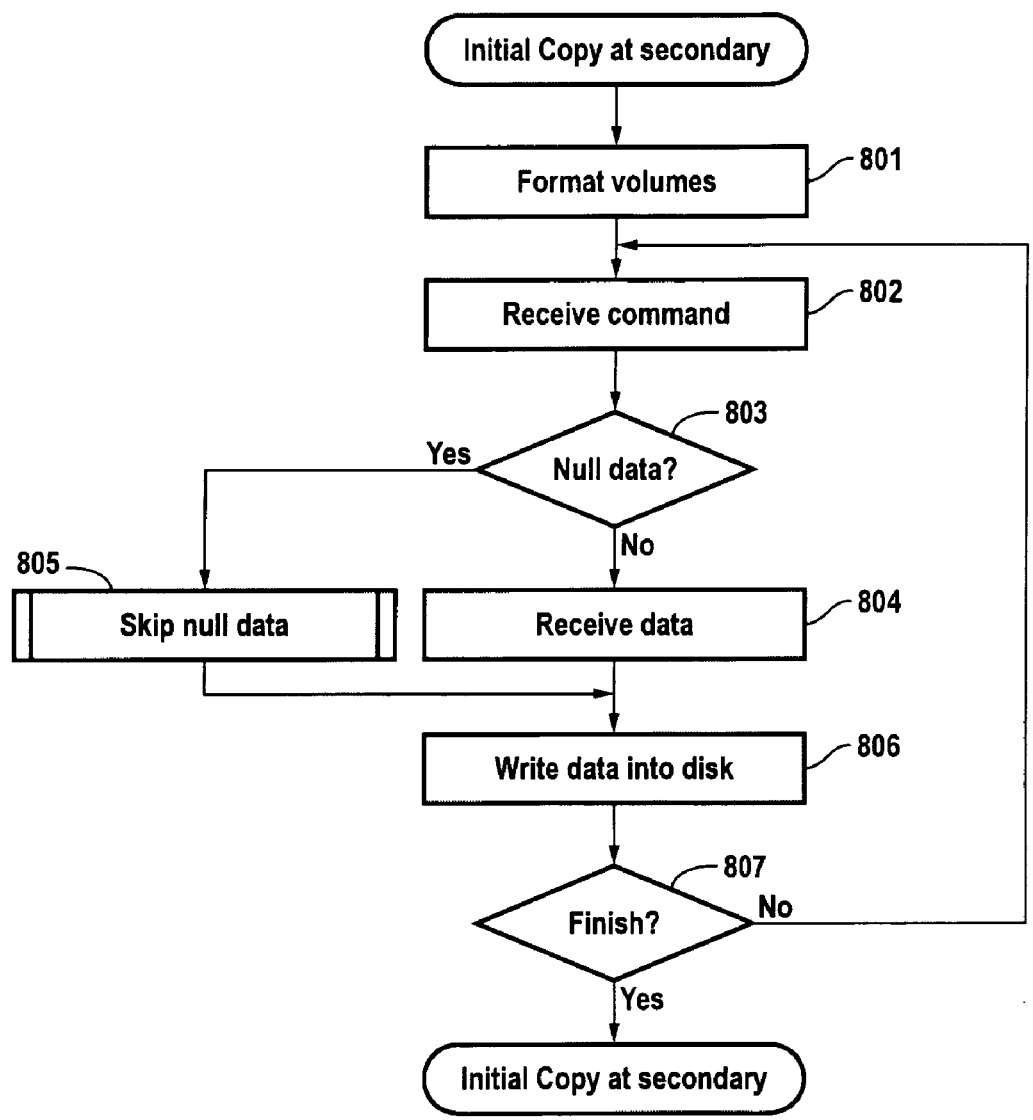
FIG. 8 is a flowchart illustrating the process of an initial copy of a secondary storage subsystem.

FIG. 8 is a flowchart which illustrates the operation of the initial copy process at the secondary storage system 103. As described above, the initial optional step is for the administrator to format the volumes of the secondary storage, as shown by step 801. When a command to perform the initial copy at the secondary storage location is received at step 802, the procedure begins. At this time, the channel controller 121 receives the initial (remote) copy command over network 105. The CPU 206 analyzes the command which is received by the channel interface 204. If the command is to copy normal data, then the CPU 206 commands that channel interface 204 to receive data from the primary storage system 102 via network 105. As the data arrives, the channel interface 204 stores the data into memory 205.

Next, under control the CPU 206, the DMA unit 207 is instructed to move data from memory 205 to cache memory 120. This request from CPU 206 is stored in control table 127. The disk controller 123 periodically checks the control table 127. When the disk controller 123 detects a request, the CPU 306 commands the disk interface 308 to issue a write command and write the data into the disk. This is shown in the flowchart by steps 803, 804, and 806. This is the operation for normal (non-null) data.

On the other hand, if the command received by channel controller 121 is a skip message indicative of null data, then the CPU 206 begins the skip procedure. Thus, null data has been detected at step 803, and the skip null data operation of step 805 is performed. In this situation, the secondary storage system 103 does not copy the data onto the disk, because the disk, by previously having been cleaned or formatted, has that null data already stored in the addressed location. If the skip message is to write data of some pattern, and that pattern is not already in place in the secondary storage location because the disk was not cleaned or formatted, then the disk controller 123, when it detects the skip request, will write the specified pattern onto the disk. This is achieved by having CPU 306 generate the desired pattern in memory 305 and provide commands to the disk interface unit 308 to write the data into the disk. The procedure described above, as shown by step 807, is carried out repeatedly until the initial copy at the secondary storage location 103 is completed.

Figure 9A:
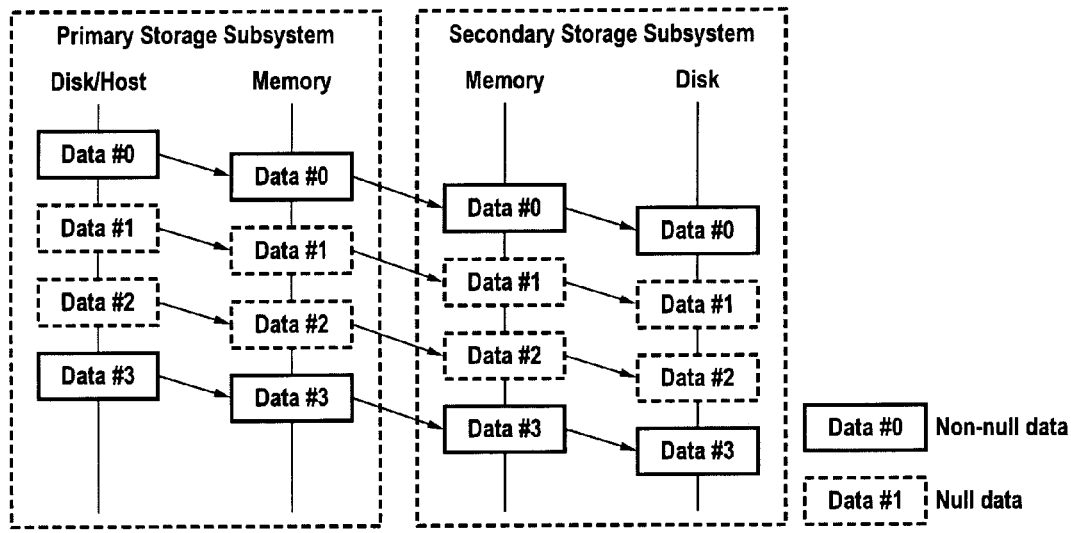
FIG. 9a illustrates the conventional prior art operation in which null data is copied without being skipped.
Figure 9B:
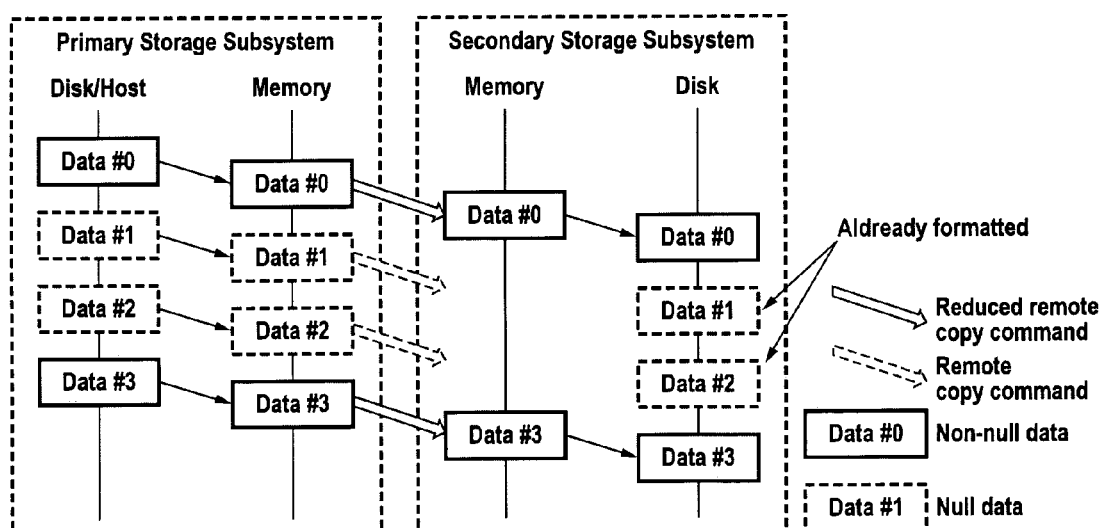
FIG. 9b illustrates the operation of a remote copy where null data is skipped.
Figure 9C:
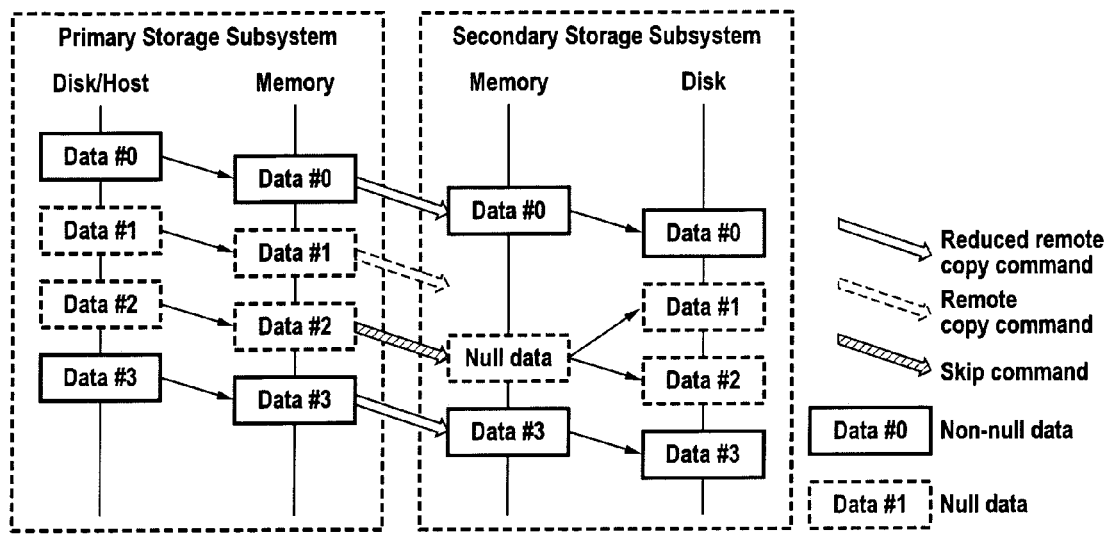
FIG. 9c illustrates the operation of a remote copy where null data is skipped by employing a message to skip it.

As described earlier, there are several methods for skipping null data during reading and writing in the secondary storage location. FIGS. 9b and 9c illustrate two of these methods of skipping null data. FIG. 9a illustrates the procedure if null data is not skipped. FIG. 9a is discussed first. In FIG. 9a Data 0 and Data 3 are normal data, while Data 1 and Data 2 are null data. In the normal initial or remote copy operation as shown by FIG. 9a, the primary storage subsystem 102 will issue four copy commands, one for each of the sets of data, Data 0, Data 1, Data 2 and Data 3. These commands cause the data to be transferred from the memory in the primary storage system 102 to the memory in the secondary storage system 103. Once in the secondary storage system, four more commands are decoded and carried out, resulting in the writing of Data 0, Data 1, Data 2 and Data 3 onto the disks of the secondary storage system. As evident from the discussion above, essentially all of the time and communication bandwidth used to transfer Data 1 and Data 2 within the primary storage system, across the network and then to rewrite it into the secondary storage system are unnecessary and wasted.

FIGS. 9b and 9c illustrates two techniques for skipping null data. FIG. 9b illustrates the skipping of null data in the situation in which the secondary storage subsystem volumes have already been formatted in a manner to match the formatting of the null data in the primary storage system. In the case of FIG. 9b, using the techniques described above in conjunction with FIGS. 7 and 8, the primary storage system detects that Data 1 and Data 2 are null data, and that there is no need to transmit them to the secondary storage system. Knowing that the secondary storage system is already appropriately formatted, the primary storage system does not need to transmit Data 1 or Data 2, or otherwise send any indication of the existence of the Data 1 or Data 2. Once Data 0 and Data 3 are copied into the secondary storage subsystem volumes, the contents of those volumes will match (mirror) the contents of the corresponding volumes in the primary storage system 102.

An alternative procedure may be implemented when the secondary storage subsystem 103 is not formatted. In this circumstance, if the primary storage system issues the initial copy command sequentially, the secondary storage system will be able to detect that the addresses for Data 1 and Data 2 have been skipped. In this circumstance, while null Data 1 and null Data 2 are not transmitted across the network, the secondary storage system writes the appropriate form of null data onto its storage volumes because it is able to detect the skipped addresses of Data 1 and Data 2.

FIG. 9c illustrates another implementation of a preferred embodiment of this invention. In the case of FIG. 9c, the skipping of null data is indicated by the transmission of a message from the primary storage subsystem 102 to the secondary storage system 103 indicating that null data has been skipped. In this circumstance the volumes in the secondary storage subsystem do not need to be formatted in advance. As shown by the diagram, the existence of null data as consisting of Data 1 and Data 2 is detected by the primary storage subsystem, for example by the DMA unit snooping the bus on which the data is available. When some of the data, for example Data 1 and Data 2, are determined to be null data, the primary subsystem 102 bundles them together into one message and sends that information to the secondary storage subsystem 103. The secondary storage subsystem, having analyzed the skip message sent to it from the primary storage subsystem 102, proceeds to write null data into the storage volumes in the location specified by the skip message for the locations of Data 1 and Data 2. The transmission of the skip message, although it does not eliminate the need to write the appropriate data into the secondary storage system, does lessen traffic on the network, and reduce overhead at the secondary location, yielding additional bandwidth for the transfer of "real" data between the primary and secondary subsystems.

Figure 9D:
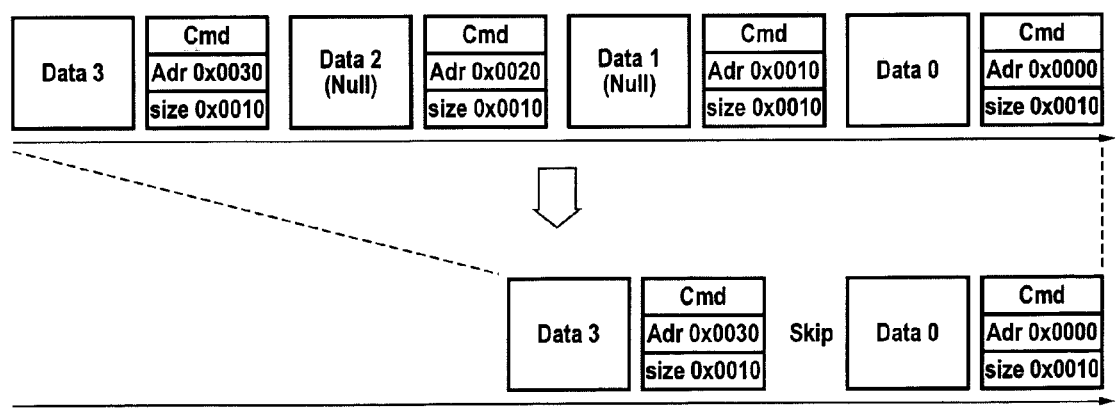
FIG. 9d illustrates skipping transmission and copying of null data.

FIG. 9d illustrates the operation of skipping null data from another perspective. In the upper portion of the figure, the data (null and non-null) is shown along with the normal commands that would write it onto the secondary system. The command (Cmd) is to write the block of data of the designated size and address (Adr). For example, the first command is to write data of a size 0×0010 at address 0×0030. The lower portion of the figure illustrates how only the non-null data is transmitted to the secondary subsystem.

Figure 10A:
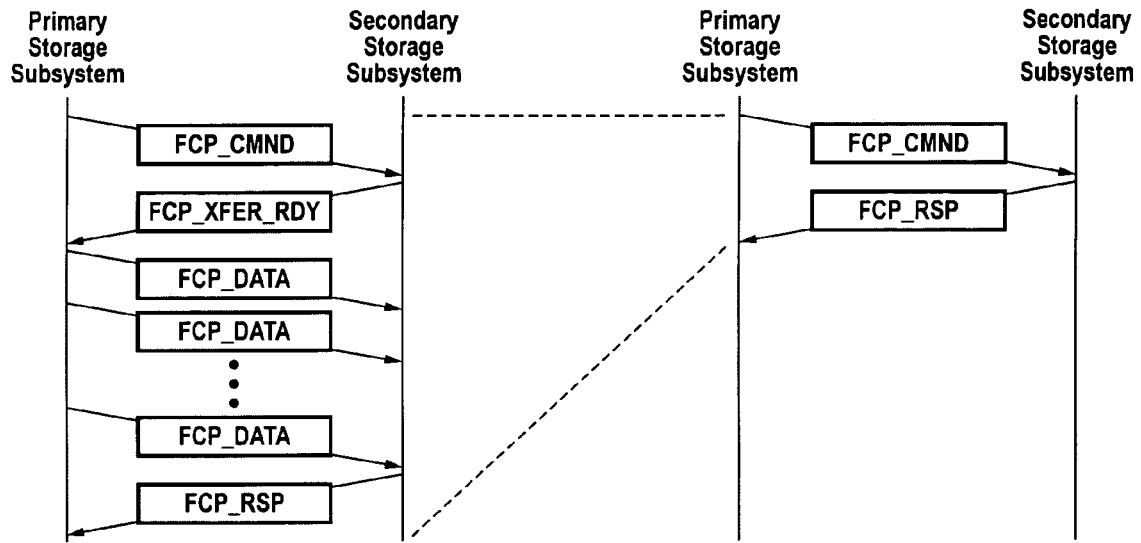
FIGS. 10a and 10b illustrate the relationship of operations at the primary storage system and the secondary storage system for one embodiment of the invention.

FIG. 10a is a diagram illustrating the skip message. On the left-hand side of FIG. 10a, note the number of transfers of data between the primary and the second storage system for the purpose of transmitting null data from one to the other. On the right-hand side of FIG. 10*a*, a skip message is used to indicate that the designated data "chunks" may be skipped. All of the steps of transmitting data (FCP_DATA) are eliminated.

Figure 10B:
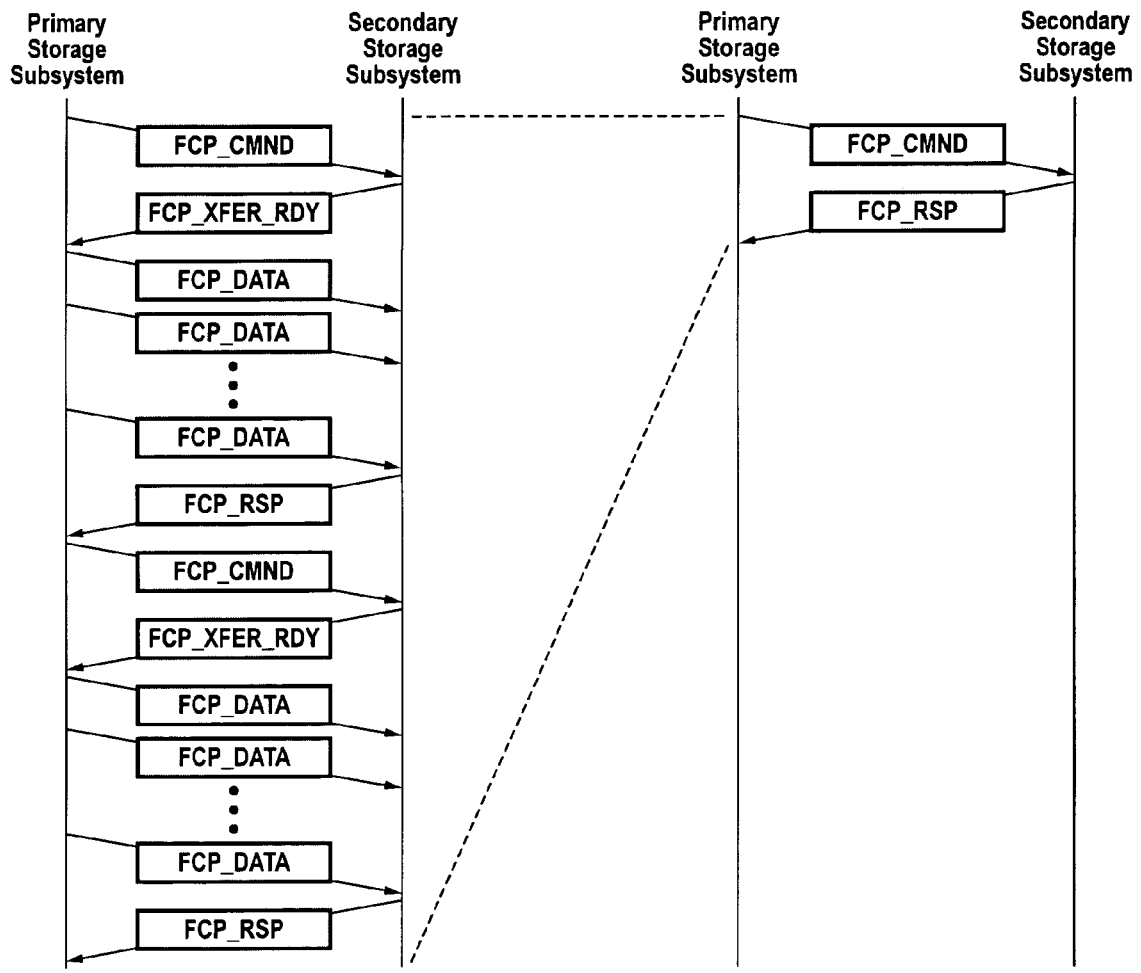

FIG. 10*b* is a diagram similar to FIG. 10*a*. As shown in the left-hand side of FIG. 10*b*, if the null data is transmitted, numerous chunks of null data are transferred from the primary to the secondary storage system. In contrast, on the right-hand side of FIG. 10*b*, implementation of the method of this invention has eliminated the need to transmit all of the null data between the two storage subsystem. The null data transfer is shown by the same command as described in conjunction with FIG. 10*a*.

FIG. 11 is an example of a skip message. The message consists of nine bytes (shown in the rows) with the state of each bit of the nine bytes shown in the columns. The operation code indicates to skip copying, with the starting logical block address shown in bytes 2–5 and the transfer length in bytes 7–8.

FIG. 12 is an example of a skip message, but which includes a desired data pattern to be written at the secondary storage subsystem location. The skip message is of the same format as FIG. 11, but the desired data pattern to be written on the storage volumes is provided as byte 6 of the message. Of course, the message format shown in FIGS. 11 and 12 are exemplary. Vendor-specific messages may be employed in which various sizes of null data are to be skipped based on a particular message or command. For example, a specific message can be sent to skip copying the next 10 bytes, the next 100 bytes, etc.

Figures 13, 14:
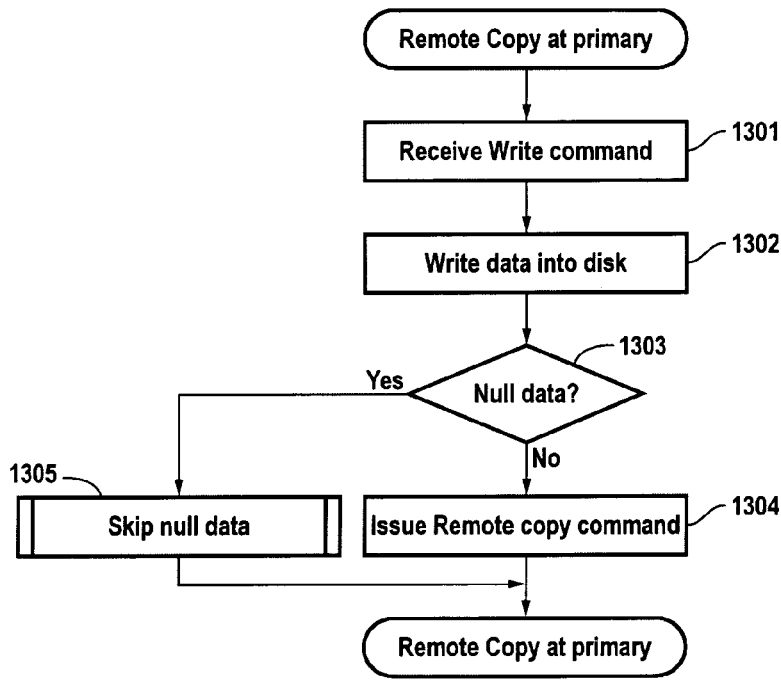
FIG. 13 is a flow chart illustrating operations of the primary storage system and operation of the direct memory access unit to locate null data.
FIG. 14 is a diagram illustrating various modes of operation of the storage system.

FIG. 13 is a flowchart illustrating the procedure followed when host writes are performed using a channel controller to the primary storage subsystem. In this circumstance, the initial storage of data in the primary system can be expedited when the write operations detect null data. In this case, the CPU 206 of the channel controller 111 handles host input/output operations, that is, steps 1301 and 1303. The CPU 206 of channel controller 112 handles the remote copy procedure, that is, steps 1303, 1304 and 1305.

When the host 101 issues a "write" command, the channel interface 204 receives it and reports it to the CPU 206, sometimes using memory 205 to store it. CPU 206 analyzes the command, and if it is valid begins to execute it. If the command is invalid, CPU 206 issues a "no good" status via the channel interface 204 back to host 101. Such an operation is, for example, in accordance with the SCSI specification.

Assuming the command is valid, CPU 206 instructs the interface unit 204 to begin transferring data from host 101. Interface unit 204 transfers data from the channel 103 to the memory 205. The CPU 206 waits until a specified amount of data is transferred into memory 205, and then issues a command to DMA 207. DMA 207 is instructed to transfer data from memory 205 to cache memory 110 using the internal interface 208 and the internal bus 203. The CPU 206 controls the interface 208 so that it does not overtake the channel interface 204. When all of the data is transferred into the cache memory 110, the CPU 206 sends a "good" status report back to host 101 via channel interface 204 and channel 103. As these procedures are carried out, the CPU 206 will periodically update the control table 117. All of these operations are subsumed within the right command step 1301 of FIG. 13.

As the transfer is occurring in the manner described above, the DMA 207 will snoop on the data pattern. If the data is null data, the DMA 207 will cause the CPU 206 to put a skip message into control table 117. The CPU 306 of the disk controller 113, as it writes data, periodically checks the control table 117. When that CPU 306 detects a skip message, which will be processed by the disk controller 113, CPU 306 begins the procedure to write the data. All of the information needed for the procedure is now included within control table 117. CPU 306 commands the DMA 307 to transfer data from the cache memory 110 to the memory 305 at a pace which does not overtake channel controller 111 checking with control table 117. During this data transfer, the DMA 307 can also detect null data. CPU 306 waits until a specified amount of data are transferred into memory 305. If the data is null data, the CPU 306 puts a skip message into the control table 117. CPU 306 then begins the data transfer from memory 305 to disk 115 via the disk interface unit 308 and the disk bus 303. CPU 306 controls the disk interface 308 to assure that it does not overtake the internal interface 304. Once all of the data is written onto disk 115, the CPU 306 issues a remote copy information into control table 117, again as shown by step 1302.

Channel controller 112 periodically checks control table 117. When the channel controller 112 detects a remote copy request, it starts the remote copy procedure. If there are two successive remote copy procedures, the CPU 206 may combine them into one remote copy command, either generic or vendor specific. Before issuing the remote copy command, the CPU 206 checks the control table 117. If it finds a skip message, then the CPU 206 will issue that skip message as shown by steps 1305. If CPU 206 does not find a skip message, then it issues the remote copy command and transfers data to the secondary storage subsystem 103. The remote copy operation at the secondary storage subsystem 103 is the same as described in conjunction with steps 802–806 of FIG. 8.

FIG. 14 is a diagram which summarizes different operations of the methods and apparatus described above. In FIG. 14 the first column indicates the particular application, in other words whether null data is detected during the making of an initial copy at the secondary location, or even earlier during the write to the primary storage location. The next column of FIG. 14 identifies what component detects the null data at the primary storage location. In the case of the initial copy from the primary storage subsystem to the secondary storage subsystem, the null data is detected using the disk controller. In contrast, in the case of the data first being written into the primary storage system from the host, the channel controller detects the null data.

The next column of the chart summarizes what occurs in response to the detection of null data. In the case of the detection occurring at the disk controller, i.e., based upon the initial copy operation, either a skip message can be generated, or the data can be ignored. These two conditions were described in conjunction with FIGS. 9*b* and 9*c* respectively. If the channel controller detects the null data as it arrives from the host, a skip message is employed to convey to the downstream disks that writing of that data is to be skipped. This condition was explained in conjunction with FIG. 9*c*.

The right-hand column of FIG. 14 illustrates what happens at the target subsystem. In the case of the initial copy application, all of the actions at the target subsystem occur at the secondary system. In the case of the skip message, if the disk has already been appropriately formatted, no action is necessary at the secondary subsystem. If the disk has not been previously formatted, then as shown in the right-hand block, no data needs to be written. Similarly, for the situation in which the initial copy is performed, and the null data is to be just skipped, if the disk has been previously formatted, no action is necessary at the secondary subsystem. If the disk is not, has not been previously cleaned or formatted, null data must be written. The bottom row of the table in FIG. 14 illustrates the operation for the host write application. In this circumstance, a skip message will result in the writing of null data at the primary subsystem.

The foregoing has been a description of the preferred embodiment of the invention. It will be appreciated that variations may be made to implement the invention without departing from the scope of the following claims.

What is claimed is:

1. A method for copying information from a primary storage system to a secondary storage system, the method comprising:
   at the primary storage system, analyzing the information to be copied to determine if it constitutes data desired to be copied or null data which does not need to be copied;
   transmitting to the secondary storage system the data desired to be copied and not transmitting the null data;
   at the secondary storage system, writing to a storage unit in the secondary storage system the information that constitutes the data desired to be copied; and
   at the secondary storage system, writing to the storage unit in the secondary storage system a pattern of data other than null data at the location where null data would have been stored had it been transmitted to the secondary storage system.

2. A method as in claim 1 wherein before the step of at the secondary storage system copying to a storage unit, a step is performed of formatting the storage unit to contain null data.

3. A method as in claim 1 further including the step of transmitting to the secondary storage system a skip message which indicates that a block of the pattern of data is present on the primary storage system and will not be transmitted to the secondary storage system.

4. A method as in claim 3 wherein after receiving the skip message the secondary storage system writes the pattern of data onto the storage unit.

5. A method for copying information from a primary storage system to a secondary storage system, the method comprising:
   at the primary storage system, analyzing the information to be copied to determine if it constitutes data desired to be copied or null data which does not need to be copied;
   transmitting to the secondary storage system the data desired to be copied and not transmitting the null data; and
   at the secondary storage system, writing to a storage unit in the secondary storage system the information to be copied,
   wherein the step of transmitting further comprises transmitting to the secondary storage system a pattern for the null data to be written onto the secondary storage system at the location where null data would have been stored had it been transmitted to the secondary storage system.

6. A method for copying information from a primary storage system to a secondary storage system, the method comprising:
   at the primary storage system, analyzing the information to be copied to determine if it constitutes data desired to be copied or null data which does not need to be copied;
   transmitting to the secondary storage system the data desired to be copied and not transmitting the null data;
   at the secondary storage system, writing to a storage unit in the secondary storage system the information to be copied;
   transmitting to the secondary storage system a skip message which indicates that a block of null data is present on the primary storage system and will not be transmitted to the secondary storage system, wherein the skip message further comprises a pattern for data to be written onto the secondary storage system at the location where null data would have been stored had it been transmitted to the secondary storage system.

7. A method as in claim 1 wherein the primary storage system includes a disk controller and the disk controller performs the step of analyzing the information to be copied to determine if it constitutes data desired to be copied or null data.

8. A method for copying information from a primary storage system to a secondary storage system, the method comprising:
   at the primary storage system, analyzing the information to be copied to determine if it constitutes data desired to be copied or null data which does not need to be copied;
   transmitting to the secondary storage system the data desired to be copied and not transmitting the null data; and
   at the secondary storage system, writing to a storage unit in the secondary storage system the information to be copied,
   the data to be copied being transmitted from the primary storage system to the secondary storage system in a sequential order,
   the secondary storage system writing null data onto the storage unit when the secondary storage unit detects gaps in the sequential order.

9. A method as in claim 1 wherein the step of analyzing the information is performed as the information is transmitted on a bus in the primary storage system.

10. A method for copying information from a primary storage system to a secondary storage system, the method comprising:
    at the primary storage system, analyzing the information to be copied to determine if it constitutes data desired to be copied or null data which does not need to be copied;
    transmitting to the secondary storage system the data desired to be copied and not transmitting the null data; and
    at the secondary storage system, writing to a storage unit in the secondary storage system the information to be copied,
    wherein the analyzing is performed as the information is transmitted on a bus in the primary storage system,
    wherein a DMA controller is used to snoop the bus and analyze the information.

11. In a system having a host and a storage system coupled to the host, the storage system including a channel controller coupled to the host and apparatus for storing data, a method for writing data into the apparatus comprising:
    monitoring the data as it is transferred to the storage system;
    when a block of data consists only of null data sending a skip message to the apparatus to cause the apparatus not to write that null data and instead writes a pattern of data other than null data; and when a block of data consists of non-null data sending that data to the apparatus and causing the apparatus to write that data.

12. A method as in claim 11 wherein before the non-null data is written, a step is performed of formatting the apparatus to contain null data.

13. A method as in claim 11 wherein the skip message indicates the address of the null data.

14. A method as in claim 13 wherein the skip message also indicates an amount of null data.

15. A method as in claim 13 wherein after receiving the skip message the apparatus writes the pattern of data at the address of the null data.

16. In a system having a host and a storage system coupled to the host, the storage system including a channel controller coupled to the host and apparatus for storing data, a method for writing data into the apparatus comprising:
   monitoring the data as it is transferred to the storage system;
   when a block of data consists only of null data sending a skip message to the apparatus to cause the apparatus not to write that null data; and
   when a block of data consists of non-null data sending that data to the apparatus and causing the apparatus to write that data,
   wherein the skip message further comprises a pattern for the null data and the address of the null data.

17. A method as in claim 16 wherein after receiving the skip message the apparatus writes the pattern for the null data at the address of the null data.

18. A method as in claim 11 wherein the storage subsystem includes a disk controller and the disk controller performs the step of analyzing the information to be copied to determine if it constitutes null data.

19. At a primary storage system, a method of selecting stored data to send from the primary storage system to a secondary storage system comprising:
   reading a selected amount of the stored data;
   determining if the stored data is null data or non-null by using a DMA controller snoop a data bus over which data is sent to the secondary storage system;
   if the stored data is non-null data then sending it with a command to the secondary storage system to cause the secondary storage system to store the data;
   if the stored data is null data then not sending it to the secondary storage system; and
   repeating the preceding steps until all of the stored data has been either sent to the secondary system or has been determined to be null data.

20. A method as in claim 19 wherein the step of if the stored data is null data then not sending it to the secondary storage system further comprises sending to the secondary storage system a message indicating that null data has not been sent.

21. A method as in claim 20 wherein the message indicates an address of the null data and a quantity of the null data.

* * * * *